US012733663B2

(12) United States Patent
Kirtley et al.

(10) Patent No.: US 12,733,663 B2

(45) **Date of Patent: *Sep. 15, 2026**

(54) LIQUIFIED POTATO PRODUCT AND PROCESS

(71) Applicant: McCain Foods Limited, New Brunswick (CA)

(72) Inventors: Nigel Kirtley, Glencoe, IL (US); Ray Laudano, Libertyville, IL (US); Derek E. Spors, Boulder, CO (US)

(73) Assignee: McCain Foods Limited, Florenceville-Bristol (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,995

(22) Filed: Oct. 24, 2023

(65) Prior Publication Data

US 2024/0049757 A1 Feb. 15, 2024

Related U.S. Application Data

(63) Continuation of application No. 16/894,095, filed on Jun. 5, 2020.

(60) Provisional application No. 62/859,542, filed on Jun. 10, 2019.

(51) Int. Cl.

| | |
|---|---|
| ***A23L 19/12*** | (2016.01) |
| ***A23L 5/10*** | (2016.01) |
| ***A23L 5/30*** | (2016.01) |
| ***A23L 19/00*** | (2016.01) |

(52) U.S. Cl.

CPC ................ *A23L 19/12* (2016.08); *A23L 5/13* (2016.08); *A23L 5/30* (2016.08); *A23L 19/09* (2016.08); *A23L 19/13* (2016.08); *A23V 2002/00* (2013.01)

(58) Field of Classification Search

CPC .......... A23L 19/09; A23L 19/10; A23L 19/12; A23L 19/13; A23L 23/00; A23L 23/10

See application file for complete search history.

(56) References Cited

U.S. PATENT DOCUMENTS

| | | | |
|---|---|---|---|
| 4,160,849 | A | 7/1979 | Huchette et al. |
| 6,251,465 | B1 | 6/2001 | Bello et al. |
| 6,485,775 | B1 | 11/2002 | Camin et al. |

(Continued)

FOREIGN PATENT DOCUMENTS

| | | | |
|---|---|---|---|
| AU | 2013270528 | A1 | 6/2015 |
| AU | 2014200598 | A1 | 8/2015 |

(Continued)

OTHER PUBLICATIONS

Chinese Office Action dated Jul. 8, 2024 for related Chinese Patent Application No. 202080042536.3, 5 pages.

(Continued)

*Primary Examiner* — Erik Kashnikow
*Assistant Examiner* — Bryan Kim
(74) *Attorney, Agent, or Firm* — Hovey Williams LLP; Kameron D. Kelly

(57) ABSTRACT

A liquid potato-derived product may be produced from whole raw potatoes and may be utilized to produce various healthy food products, such as dips and sauces. This liquid potato product may be produced from raw potatoes by pretreating the potatoes, gelatinizing the pretreated potatoes, and then liquefying the gelatinized potatoes under sufficient shear.

24 Claims, 4 Drawing Sheets

(56) References Cited

U.S. PATENT DOCUMENTS

| | | | | |
|---|---|---|---|---|
| 6,706,298 | B1 | 3/2004 | Villagran et al. | |
| 6,808,734 | B2 | 10/2004 | Villagran | |
| 7,026,006 | B1 | 4/2006 | McArthur et al. | |
| 7,820,223 | B2 | 10/2010 | Bhaskar et al. | |
| 7,879,385 | B1 * | 2/2011 | Jensen | A23L 11/05 426/654 |
| 8,282,978 | B1 | 10/2012 | Jensen et al. | |
| 8,304,011 | B1 | 11/2012 | McArthur et al. | |
| 8,632,835 | B2 | 1/2014 | Joseph et al. | |
| 8,877,278 | B2 | 11/2014 | Joseph et al. | |
| 8,940,346 | B1 | 1/2015 | Pan et al. | |
| 9,723,851 | B2 | 8/2017 | Pan et al. | |
| 2002/0189607 | A1 | 12/2002 | Lavoie et al. | |
| 2006/0188638 | A1 | 8/2006 | Joseph et al. | |
| 2006/0188639 | A1 | 8/2006 | Joseph et al. | |
| 2007/0059427 | A1 * | 3/2007 | Dohman | A23B 7/0053 426/637 |
| 2007/0098875 | A1 | 5/2007 | Howard et al. | |
| 2010/0080868 | A1 | 4/2010 | Crosby et al. | |
| 2011/0076380 | A1 | 3/2011 | Dyhin | |
| 2011/0104345 | A1 * | 5/2011 | Bhaskar | A23B 7/10 426/637 |
| 2016/0303752 | A1 | 10/2016 | Hilliard et al. | |
| 2019/0037904 | A1 | 2/2019 | Daly et al. | |

FOREIGN PATENT DOCUMENTS

| | | | |
|---|---|---|---|
| AU | 2014200757 | A1 | 9/2015 |
| CN | 107549536 | A | 1/2018 |
| EP | 0313438 | A1 | 4/1989 |
| EP | 0800773 | A1 | 10/1997 |
| EP | 1229804 | B1 | 1/2008 |
| EP | 2249664 | A1 | 11/2010 |
| FR | 2713894 | | 12/1993 |
| JP | 2020535833 | | 12/2020 |
| WO | 00/22939 | A2 | 4/2000 |
| WO | 01/35763 | A1 | 5/2001 |
| WO | 02/07535 | A2 | 1/2002 |
| WO | 2009/080860 | A1 | 7/2009 |

OTHER PUBLICATIONS

Nissreen Abu-Ghannam et al., The effect of low temperature blanching on the texture of whole processed new potatoes, Elsevier Journal of Food Engineering, Department of Food Science and Environmental Health, Dublin Institute of Technology, Cathal Brugha St., Dublin 1, Ireland, Sep. 6, 2004, 10 pages.

Maria Dolores Alvarez et al., Rheological behavior of fresh and frozen potato puree in steady and dynamic shear at different temperatures, Euroopean Food Research and Technology, May 2004, DOI: 10.1007/s00217-004-0897-2, 11 pages.

Search Report and Written Opinion dated Aug. 18, 2020 for related PCT Patent Application No. PCT/IB2020/055390, filed Jun. 9, 2020, 9 pages.

Search Report and Written Opinion dated Aug. 21, 2020 for related PCT Patent Application No. PCT/IB2020/055391, filed Jun. 9, 2020, 7 pages.

Great Britain Examination Report dated Aug. 23, 2021 for related Great Britain Patent Application No. GB2008775.5, 6 pages.

European Examination Report for related Euopean Application No. 20822358.6, dated Jul. 25, 2023, 10 pages.

Giannopoulos Eli: "Skordalia recipe (Traditional Greek Potato and Garlic dip)—My Greek Dish", MyGreekDish.com, Mar. 15, 2014 (Mar. 15, 2014), pp. 1-5, XP093064015, Retrieved from the Internet:URL:https%3A%2F%2Fweb.archive.org%2Fweb%2F20140315132513%2Fhttps%3A%2F%2F, www.mygreekdish.com%2Frecipe%2Fgreek-skordalia-recipepotato-garlic-dip%2F [retrieved on Jul. 14, 2023].

European Examination Report dated Jan. 30, 2024, for related European Application No. 20822358.6, 8 pages.

Dankar Iman et al.; Assessing Mechanical and Rheological Properties of Potato Puree: Effect of Different Ingredient Combinations and Cooking Methods on the Feasibility of 3D Printing, Foods, vol. 9, No. 1, 24, Dec. 2019, p. 21, XP093120746, CH, ISSN: 2304-8158, DOI: 10.3390/foods9010021.

Japanese Office Action dated Mar. 8, 2024 for related Japanese Patent Application No. 2021-572898, 3 pages.

Brazilian Office Action dated May 21, 2025 for related Brazilian Patent Application No. BR112021024991-5, 4 pages.

Colombian Office Action dated Oct. 31, 2025 for related Colombian Patent Application No. NC2021/0016634, 11 pages.

* cited by examiner

LIQUIFIED POTATO PRODUCT AND PROCESS

RELATED APPLICATIONS

This application claims the priority benefit under 35 U.S.C. § 119(e) of U.S. Provisional Patent Application Ser. No. 62/859,542 entitled "LIQUIFIED POTATO PRODUCT AND PROCESS," filed Jun. 10, 2019, and is a continuation of U.S. Non-Provisional Patent Application Ser. No. 16/894,095, entitled "LIQUIFIED POTATO PRODUCT AND PROCESS," filed Jun. 5, 2020, the entire disclosures of which are incorporated herein by reference.

BACKGROUND

1. Field of the Invention

The present invention is generally related to potato-based products that may be used to produce various food products. More generally, the present application is generally related to the production of liquid potato products that may be used to produce various healthy food products.

2. Description of the Related Art

There has been an increasing emphasis on the production of healthy food products primarily derived from vegetables and other organic plant-based products. For instance, various food manufacturers have produced dips, sauces, and other food products using nuts or cauliflower as the base component. However, these existing food products may exhibit one or more deficiencies, such as poor taste, inadequate texture, allergy risks, high production costs, and overall unhealthy formulations. Thus, there still is a need to identify and efficiently produce a healthy food product from plant-based sources.

SUMMARY

A method of making a liquid potato product, the method comprising: (a) providing an initial potato feed comprising a potato component having an initial moisture content; (b) at least partially gelatinizing said initial potato feed to thereby form a gelatinous potato feed having a second moisture content, wherein said second moisture content is less than 50 percent lower than said initial moisture content; and (c) shearing at least a portion of said gelatinous potato feed in the presence of an oil to thereby form said liquid potato product.

A method of making a liquid potato product, the method comprising: (a) providing an initial potato feed comprising a potato component; (b) at least partially gelatinizing said initial potato feed to thereby form a gelatinous potato feed; and (c) shearing at least a portion of said gelatinous potato feed to thereby form said liquid potato product that exhibits at least one of the following rheological properties as measured at 12.5° C.:

i. $Y_{1-5}$ is at least 50 percent greater than $Y_{5-10}$, $Y_{1-15}$, and/or $Y_{15-20}$;

ii. $Y_{1-5}$ is greater than $Y_{10-20}$, $Y_{20-30}$, and/or $Y_{30-40}$; and iii. $Y_{1-10}$ is at least 25 percent greater than $Y_{10-20}$, $Y_{20-30}$, and/or $Y_{30-40}$;

wherein said rheological properties are measured after storing said liquid potato product for 24 hours, 48 hours, or 72 hours at 6° C.

A liquid potato product for producing a food product, the liquid potato product comprising 5 to 80 weight percent of a potato, wherein said liquid potato product exhibits two or more of the following rheological properties as measured at 12.5° C.:

i. $Y_{1-5}$ is at least 50 percent greater than $Y_{5-10}$, $Y_{10-15}$, and/or $Y_{15-20}$;

ii. $Y_{1-5}$ is greater than $Y_{10-20}$, $Y_{20-30}$, and/or $Y_{30-40}$; and iii. $Y_{1-10}$ is at least 25 percent greater than $Y_{10-20}$, $Y_{20-30}$, and/or $Y_{30-40}$;

wherein said rheological properties are either measured immediately after forming said liquid potato product or after storing said liquid potato product for 24 hours, 48 hours, or 72 hours at 6° C.

BRIEF DESCRIPTION OF THE FIGURES

Embodiments of the present invention are described herein with reference to the following drawing figures, wherein.

DETAILED DESCRIPTION

The present invention is generally related to the production of Liquid P, which is a liquid product at least partially derived from potatoes, and the use of Liquid P to produce various food products. Certain embodiments of the present invention may include a potato liquefaction system for converting potatoes and other root vegetables into a useful liquid product, such as Liquid P. As discussed below in greater detail, it has been observed that the system described herein is capable of creating a unique liquid potato product, i.e., Liquid P, which can be used to produce various types of food products that exhibit one or more desirable traits.

As used herein, the term "Liquid P" may be used interchangeably with "liquid potato product" and both refer to a substance containing at least 5 weight percent potato and having a dynamic viscosity in the range of 70 to 250,000 cP at a shear rate of 4 1/s and a temperature between 12.5° C. to 95° C.

Figure 1:
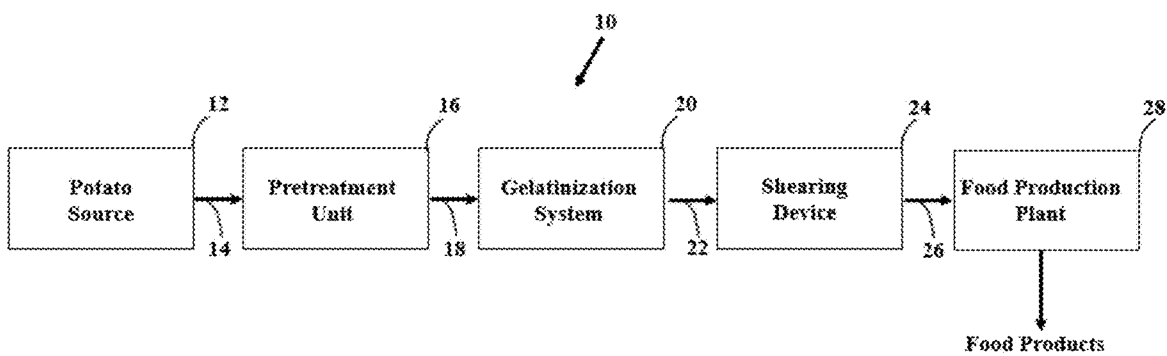
FIG. 1 depicts an exemplary Liquid P production system that may be employed to at least partially convert one or more potato-containing feeds into Liquid P and food products containing Liquid P.

FIG. 1 depicts an exemplary Liquid P production system 10 that may be employed to at least partially convert one or more potato-containing feeds into Liquid P and food products containing Liquid P. It should be understood that the Liquid P production system shown in FIG. 1 is just one example of a system within which the present invention can be embodied. Thus, the present invention may find application in a wide variety of other systems where it is desirable to efficiently and effectively produce Liquid P. The exemplary system illustrated in FIG. 1 will now be described in greater detail.

As shown above in FIG. 1, the Liquid P Production System 10 may comprise a potato source 12 for supplying one or more types of potatoes to the system 10. The potato source 12 can be, for example, a hopper, storage bin, railcar, trailer, or any other device that may hold or store potatoes and other types of vegetables.

In various embodiments, the potato feed 14 derived from the potato source 12 can comprise, consist essentially of, or consist of potatoes. Generally, in various embodiments, the potatoes supplied by the potato source 12 can comprise of any variety of *Solanum tuberosum*. Exemplary potato varieties can include, for example, Shepody potatoes, Bintje potatoes, American Blue potatoes, Royal potatoes, Innate Potatoes, Maris Piper potatoes, Focus potatoes, Yukon Gold potatoes, Lady Balfour potatoes, Kennebec potatoes, Colette potatoes, Chieftain potatoes, Innovator potatoes, Russet Burbank potatoes, purple potatoes, Russet potatoes, Bamberg potatoes, or combinations thereof.

In various embodiments, the potatoes derived from the potato source 12 can comprise whole raw potatoes.

In various embodiments, the potato feed 14 can comprise at least 25, 50, 75, 80, 85, 90, 95, or 99 weight percent of one or more potatoes, based on the total weight of the feed stream.

In certain embodiments, the potato source 12 may also supply one or more other root vegetables, such as parsnips, celery root, sweet potatoes, onions, red beets, carrots, or combinations thereof. As used herein, the term "root vegetable" refers to an edible underground plant part that comprises a higher fiber content relative to peeled potatoes.

In various embodiments, the potato feed 14 can comprise at least 1, 5, 10, 15, 20, or 25 weight percent and/or less than 90, 85, 80, 75, 70, 65, 60, 55, 50, 45, 40, 35, or 30 weight percent of one or more root vegetables, based on the total weight of the potato feed.

Turning again to FIG. 1, the potato feed 14 from the potato source 12 can be sent to a pretreatment unit 16 for further processing before any subsequent cooking and conversion steps. While in the pretreatment unit 16, the potato feed 14 can go undergo one or more treatments including, for example, washing, peeling, mashing, water bath, microwave heating, radio frequency heating, magnetic heating, electric field pulse heating, cubing, dicing, or combinations thereof. In certain embodiments, the potato feed 14 can be washed, peeled, washed again to remove any peel residue, and then diced into defined slices. In one or more embodiments, the potatoes and other root vegetables present in the potato feed 14 can be diced to pieces having average widths of at least 0.1, 0.15, 0.2, or 0.25 inches and/or less than 0.75, 0.6, or 0.5 inches.

The peeling step may be optional for the potato component in the potato feed 14. Thus, in certain embodiments, the potatoes in the potato feed 14 may be left unpeeled. Alternatively, the potato feed 14 may be peeled. In one or more embodiments, the potato component in the potato feed 14 is unpeeled and may be subjected to an optional peeling treatment while in the pretreatment unit 16 to thereby form an at least partially peeled potato component.

After leaving the pretreatment unit 16, the pretreated potato feed 18 is then introduced into a blanching and gelatinization system 20. While in the blanching and gelatinization system 20, the pretreated potato feed 18 can undergo any known process or technique for at least partially gelatinizing at least a portion of the potatoes in the potato feed. In various embodiments, the blanching and gelatinization system 20 can comprise any system or device capable of subjecting the pretreated potato feed 18 to a gelatinization process, such as a microwave, a hot water bath, autoclave, or any other device known in the art.

Generally, the gelatinization process can involve any heat treatment capable of at least partially gelatinizing the potatoes in the pretreated potato feed 18. Such techniques may include, for example, microwaving, boiling, scalding, blanching, or combinations thereof.

In certain embodiments, the gelatinization process comprises blanching. Generally, in various embodiments, the blanching process can involve: (i) contacting the pretreated potato feed 18 with hot water and/or steam and (ii) subsequently contacting the cooked potato feed with an aqueous solution to thereby form the gelatinized feed 22. In certain embodiments, the aqueous solution can comprise one or more chelating agents and/or pH-modifying agents, such as citric acid, EDTA, a phosphate compound, or a combination thereof.

It should be noted that, in various embodiments, the gelatinization process does not involve a mashing step. Thus, in such embodiments, the gelatinized potato feed would not be considered "mashed."

Although not wishing to be bound by theory, it is believed that the blanching step may help to mitigate undesirable enzymes in the potato feed, remove the peels from the potatoes (if still present), and modify the texture of the potatoes and other root vegetables in the potato feed.

In certain embodiments, the first step of the blanching process can comprise contacting the pretreated potato feed 18 with heated water over a time period of at least 1, 2, 3, 4, or 5 minutes and/or less than 30, 25, 20, 15, or 10 minutes. In such embodiments, this water heat treatment can occur at around atmospheric pressures and at a temperature of at least 50° C., 55° C., 60° C., 65° C., 70° C., 75° C., or 80° C. Additionally or alternatively, in various embodiments, the water heat treatment can occur at a temperature of less than 150° C., 125° C., 100° C., 95° C., 90° C., 85° C., 80° C., 75° C., 70° C., 65° C., 60° C., or 55° C.

In certain embodiments, the first step of the blanching process can comprise contacting the pretreated potato feed 18 with pressurized steam over a time period of at least 1, 2, 3, 4, or 5 minutes and/or less than 30, 25, 20, 15, or 10 minutes. In such embodiments, this steam treatment can occur at a gauge pressure of at least 10, 25, 50, 75, 100, or 125 psig and/or less than 300, 250, 200, 175, or 160 psig and at temperature of at least 100° C., 125° C., or 150° C. and/or less than 300° C., 250° C., 200° C., or 185° C.

In certain embodiments, the second step of the blanching process can occur at a temperature of at least 10° C., 15° C., 20° C., 25° C., 30° C., 35° C., 40° C., 45° C., 50° C., 55° C., 60° C., 65° C., 70° C., 75° C., or 80° C. and/or less than 150° C., 125° C., 100° C., 95° C., 90° C., 85° C., 80° C., 75° C., 70° C., 65° C., or 60° C. Additionally or alternatively, in various embodiments, the second step of the blanching process can occur over a time period of less than 10, 5, 4, 3, 2, or 1 minutes.

In certain embodiments, the gelatinization process will remove very little water and/or solids from the pretreated potato feed 18. Unlike prior art gelatinization techniques that partially dehydrate the potato feeds, the gelatinization techniques of the present disclosure may attempt to retain much of the water, moisture, and solids naturally present in the potatoes. For example, in various embodiments, the moisture content (by weight) of the gelatinized potato feed 22 is less than 50, 45, 40, 35, 30, 25, 20, 15, 10, 9, 8, 7, 6, 5, 4, or 3 percent lower than the moisture content of the pretreated potato feed 18. In other words, the moisture content of the gelatinized potato feed 22 is at least 50, 55, 60, 65, 70, 75, 80, 85, 90, 91, 92, 93, 94, 95, 96, or 97 percent of the moisture content of the pretreated potato feed 18.

Upon leaving the gelatinization system 20, at least a portion of the gelatinized potato feed 22 can be introduced into a shearing device 24. While in the shearing device 24, the gelatinized potato feed 22 can be subjected to the specific temperature and shear conditions necessary to produce the Liquid P 26. Although not wishing to be bound by theory, the shearing step may be carried out at under specific temperature, pressure, and/or shear conditions so that the starch in the gelatinized potato feed 22 may become fully gelatinized, thereby facilitating the formation of the Liquid P. Generally, in various embodiments, the temperature of the gelatinized potato feed 22 must reach at least 67° C. in order to fully gelatinize the starch within the feed during the shearing step. This temperature can be derived from the shearing rates and conditions and/or from an external heating source (e.g., a heating jacket around the shearing device). Thus, in various embodiments, the shearing step may be a form of hot milling due to these temperature requirements. As used herein, "shearing" refers to a mechanical treatment that induces a shear rate through the liquid which changes the underlying micro-structure. Thus, for example, shearing may include particle comminution.

The shearing device 24 can comprise any shearing device known in the art capable of providing the high shear necessary to produce the Liquid P 26 from the gelatinized potato feed 22. Exemplary shearing devices can include, for example, a food processor, a high shear mixer with an impeller, or a high-speed turbine with a shroud. In certain embodiments, the shearing device 24 can comprise a high-speed turbine with a shroud, wherein the rpm of the turbine can influence the temperature and time conditions of the shearing process.

In various embodiments, the shearing step can occur at a temperature of at least 10° C., 15° C., 20° C., 25° C., 30° C., 35° C., or 40° C. and/or less than 150° C., 125° C., 100° C., 90° C., 80° C., or 75° C. and over a time period of at least 1, 2, 3, 4, 5, 6, 7, 8, 9, or 10 minutes and/or less than 60, 55, 50, 45, 40, 35, 30, 25, 20, or 15 minutes. Additionally or alternatively, in various embodiments, the shearing can occur at a pressure of at least 1, 5, 10, or 14 psig and/or less than 1,000, 900, 800, 700, 600, 500, 400, 300, 200, 100, 50, 25, 20, or 15 psig.

In various embodiments, one or more oils and/or water are added to the shearing device 24 along with the gelatinized potato feed 22. In certain embodiments, one or more oils and/or water may be added directly into the gelatinized potato feed 22 prior to introducing the feed 22 into the shearing device 24. In alternative embodiments, one or more oils and/or water may be added to the Liquid P 26 after it has left the shearing device 24. These oils and water can be useful in producing the desired viscosity of the Liquid P and may also enhance certain taste and textural properties of the resulting Liquid P. Exemplary oils can include, for example, vegetable oil, peanut oil, sunflower oil, canola oil, coconut oil, palm oil, corn oil, avocado oil, walnut oil, soybean oil, sesame oil, or combinations thereof.

In certain embodiments, an oil is added to the shearing step, but water is not added. In other embodiments, water may be added to the shearing step, but oil is not added. In yet other embodiments, both water and oil are added to the shearing step, along with the gelatinized potato feed 22.

The various characteristics and properties of the Liquid P are described below. It should be noted that, while all of the following characteristics and properties may be listed separately, it is envisioned that each of the following characteristics and/or properties of the Liquid P are not mutually exclusive and may be combined and present in any combination, unless the combination of such characteristics conflicts. Furthermore, it should be noted that all weight percentages associated with the Liquid P formulations are based on the total weight of the Liquid P formulation, unless otherwise noted.

In various embodiments, the Liquid P comprises at least 5, 10, 15, 20, 25, 30, 35, or 40 weight percent and/or less than 99, 95, 90, 85, 80, 75, 70, 65, 60, 55, or 50 weight percent of a potato component originally derived from the potatoes in the initial potato feed, based on the total weight of the Liquid P composition.

In various embodiments, the Liquid P can include up to 90 weight percent of one or more additional complex carbohydrates, such as root vegetables, other than potatoes. In certain embodiments, the additional complex carbohydrates used to make the Liquid P can have a higher fiber content than the potatoes used to make the Liquid P. Examples of additional complex carbohydrates suitable for use in Liquid P include root vegetables, such as parsnips, celery root, sweet potatoes, onions, red beets, carrots, or combinations thereof. For example, in various embodiments, the Liquid P comprises at least 1, 2, 5, 10, 15, or 20 weight percent and/or less than 60, 55, 50, 45, 40, 35, 30, 25, 20, 15, or 10 weight percent of one or more root vegetables originally present in the initial potato feed, based on the total weight of the Liquid P composition. In certain embodiments, the Liquid P comprises a weight ratio of potato to root vegetables of at least 0.1:1, 0.5:1, 1:1, 1.5:1, or 2:1 and/or less than 10:1, 9:1, 8:1, 7:1, 6:1, 5:1, 4:1, or 3:1.

In various embodiments, the oil is added in sufficient quantities so that the Liquid P comprises at least 1, 2, 3, 4, 5, 6, 7, 8, 9, or 10 weight percent and/or less than 75, 70, 65, 60, 55, 50, 45, 40, 35, 30, or 25 weight percent of the oil, based on the total weight of the Liquid P composition. In certain embodiments, the Liquid P comprises a weight ratio of potato to oil of at least 0.1:1, 0.5:1, 1:1, 2:1, 3:1, 4:1, 5:1, 6:1, or 7:1 and/or less than 100:1, 75:1, 50:1, 40:1, 30:1, or 20:1.

In various embodiments, the water is added in sufficient quantities so that the Liquid P comprises at least 1, 2, 3, 4, 5, 6, 7, 8, 9, or 10 weight percent and/or less than 75, 70, 65, 60, 55, 50, 45, 40, 35, 30, or 25 weight percent of the water, based on the total weight of the Liquid P composition.

In various embodiments, optional flavorants, optional additives, and other optional vegetables and fruits may be added into the shearing device 24 along with the gelatinized potato feed 22. These flavorants can include, for example, spices, meat, cheese, herbs, other flavorants desired in the final food product, or combinations thereof. Exemplary additives that may be added may include, for example, protein supplements (e.g., whey protein, chickpeas, soy, or combinations thereof), dietary fiber supplements, vitamins, minerals, or combinations thereof. The other vegetables and fruits that may be added at this stage can include, for example, Capsicum peppers (including sweet peppers and hot peppers), onions, spinach, kale, mushrooms, mango, artichokes, legumes, corn, olives, tomatoes, or combinations thereof. In various embodiments, the flavorants, additives, and other vegetables and fruits are added in sufficient quantities so that the Liquid P comprises at least 1, 2, 3, 4, 5, 6, 7, 8, 9, 10, 15, or 20 weight percent and/or less than 75, 70, 65, 60, 55, 50, 45, 40, 35, 30, or 25 weight percent of flavorants, additives, other vegetables, and/or other fruits, based on the total weight of the Liquid P composition. Alternatively, in certain embodiments, the Liquid P may not contain any added water and/or flavorants.

In alternative embodiments, the above-referenced root vegetables may be separately added to the shearing device 24 along with the gelatinized potato feed 22. In such embodiments, one or more root vegetables may or may not be added to the potato feed prior to introducing the gelatinized potato feed 22 into the shearing device 24. Furthermore, in embodiments where one or more root vegetables are added directly to the shearing device 24 separately from the gelatinized potato feed 22, such root vegetables may be subjected to the pretreatment and gelatinizing steps described herein so as to produce a gelatinized root vegetable feed for the shearing device 24. In such embodiments, the root vegetables may undergo the pretreatment and gelatinizing steps in the absence of any potatoes.

In certain embodiments, the gelatinized potato feed 22 is not subjected to mashing or a retrogradation step prior to the shearing step. Although not wishing to be bound by theory, it is believed that retrogradation may not occur during the production process described herein due to the amount of water present during each step of the production process, the pH of each step, the fiber contents of the potato feed due to the presence of root vegetables, and the oil added during the shearing step.

Due to the unique shearing process and additives, the Liquid P 26 can be in the form of a viscous, flowable liquid that has a shiny and smooth appearance. The Liquid P described herein can exhibit desirable rheological profiles without the need for thickening agents, such as starches, gums, flour, etc., which can be considered undesirable additives by many consumers. For example, the Liquid P may comprise less than 1, 0.5, 0.1, 0.05, or 0.01 weight percent of at least one thickening agent, based on the total weight of the Liquid P formulation.

In various embodiments, the resulting Liquid P 26 can exhibit a viscosity at 12.5° C. or 25° C. of at least 100, 250, 500, 1,000, 1,500, 2,000, 2,500, 3,000, 3,500, 4,000, 4,500, or 5,000 cP and/or less than 250,000, 200,000, 150,000, 100,000, 90,000, 80,000, 70,000, 60,000, 50,000, 40,000, 30,000, 25,000, or 20,000 cP.

Although not wishing to be bound by theory, it is believed that the high shearing conditions used in the production of the Liquid P helps form its unique rheological profile. In one or more embodiments, the Liquid P is a non-Newtonian fluid having a non-linear relationship between shear stress and shear rate.

In various embodiments, the Liquid P may exhibit a shear stress at 12.5° C. of at least 5, 10, 15, 20, 25, 30, 35, 40, 45, 50, 75, 100, 125, 150, 175, 200, 225, 250, 275, 300, 325, 350, 375, 400, 425, or 450 dynes/cm$^2$ at a shear rate of 0, 5, 10, 15, or 20 l/s. Additionally or alternatively, in various embodiments, the Liquid P may exhibit a shear stress at 12.5° C. of less than 900, 800, 700, 600, 500, 450, 400, 350, 300, 250, 200, 150, 125, 100, 75, or 50 dynes/cm$^2$ at a shear rate of 0, 5, 10, 15, or 20 l/s. It should be noted that these above rheological measurements may be applicable to the Liquid P immediately after its production or after it has been stored for 24 hours ("Day 1"), 48 hours ("Day 2"), or 72 hours ("Day 3") at 6° C.

It has been observed that the presence of a complex carbohydrate material, such as fiber and other root vegetables, in the Liquid P formulation may influence the rheological properties of the composition. As used herein, a "complex carbohydrate material" comprises a higher complex carbohydrate content relative to peeled potatoes. As noted above, a complex carbohydrate material may include other root vegetables (i.e., root vegetables that are not potatoes).

In various embodiments, the Liquid P may exhibit one of the following shear stress profiles at 12.5° C. after storing the Liquid P for 24 hours ("Day 1"), 48 hours ("Day 2"), or 72 hours ("Day 3") at 6° C.:

i. a shear stress of at least 15, 20, 25, 30, 35, 40, 45, 50, 75, 100, 125, or 150 dynes/cm$^2$ at a shear rate of 5 l/s, a shear stress of at least 25, 30, 35, 40, 45, 50, 75, 100, 125, or 150 dynes/cm$^2$ at a shear rate of 10 l/s, a shear stress of at least 35, 40, 45, 50, 75, 100, 125, or 150 dynes/cm$^2$ at a shear rate of 15 l/s, and/or a shear stress of at least 40, 45, 50, 75, 100, 125, 150, 175, 200, 225, 250, 275, 300, 325, 350, 375, or 400 dynes/cm$^2$ at a shear rate of 20 l/s, when the Liquid P comprises no complex carbohydrate materials, such as other root vegetables, or less than 10, 8, 6, 4, 2, or 1 weight percent of complex carbohydrate materials, such as other root vegetables; or ii. a shear stress of at least 150, 175, 200, 225, or 250 dynes/cm$^2$ at a shear rate of 5 l/s, a shear stress of at least 200, 225, 250, 275, 300, 325, 350, 375, or 400 dynes/cm$^2$ at a shear rate of 10 l/s, a shear stress of at least 225, 250, 275, 300, 325, 350, 375, or 400 dynes/cm$^2$ at a shear rate of 15 l/s, and/or a shear stress of at least 250, 275, 300, 325, 350, 375, or 400 dynes/cm$^2$ at a shear rate of 20 l/s, when the Liquid P comprises at least 10, 12, 14, 16, 18, 20, or 25 weight percent of at least one complex carbohydrate material, such as other root vegetables.

As noted above, the Liquid P may be a non-Newtonian fluid and, therefore, exhibit a non-linear rheological profile. As used herein, "$Y_1$," "$Y_5$," "$Y_{10}$," "$Y_{15}$," "$Y_{20}$," "$Y_{30}$," and "$Y_{40}$" refer to the shear stress values (dynes/cm$^2$) of Liquid P at 12.5° C. at shear rates of 1, 5, 10, 15, 20, 30, and 40 l/s, respectively. Furthermore, as used herein, "$Y_{1-5}$," "$Y_{5-10}$," "$Y_{10-15}$," "$Y_{15-20}$," "$Y_{1-10}$," "$Y_{10-20}$," "$Y_{20-30}$," and $Y_{30-40}$" refer to the change in shear stress values between $Y_1$ and $Y_5$, $Y_5$ and $Y_{10}$, $Y_{10}$ and $Y_{15}$, $Y_{15}$ and $Y_{20}$, $Y_1$ and $Y_{10}$, $Y_{10}$ and $Y_{20}$, $Y_{20}$ and $Y_{30}$, and $Y_{30}$ and $Y_{40}$, respectively.

In various embodiments, the Liquid P may exhibit at least 1, 2, 3, 4, 5, or 6 of the following rheological properties:

i. $Y_{1-5} \neq Y_{5-10} \approx Y_{10-15} \neq Y_{15-20}$;

ii. $Y_{10}$ is at least 50, 100, 150, 200, 250, or 300 percent greater than $Y_{10-15}$ and/or $Y_{15-20}$;

iii. $Y_{1-5}$ is at least 50, 100, 150, 200, 250, or 300 percent greater than $Y_{5-10}$, $Y_{10-15}$, and/or $Y_{15-20}$;

iv. $Y_{5-10}$ is at least 50, 100, 150, 200, 250, or 300 percent greater than $Y_{10-15}$ and/or $Y_{15-20}$;

v. $Y_{1-5}$ is greater than $Y_{10-20}$, $Y_{20-30}$, and/or $Y_{30-40}$; and/or vi. $Y_{1-10}$ is at least 25, 50, 75, 100, 125, or 150 percent greater than $Y_{10-20}$, $Y_{20-30}$, and/or $Y_{30-40}$.

It should be noted that these above rheological measurements may be applicable to the Liquid P immediately after it has been produced or after it has been stored for 24 hours ("Day 1"), 48 hours ("Day 2"), or 72 hours ("Day 3") at 6° C. Furthermore, the above rheological properties may be measured at 12.5° C. When rheological property measurements and more than one storage criteria are claimed herein (e.g., "said rheological properties are either measured after storing said liquid potato product for 24 hours at 6° C., 48 hours at 6° C., or 72 hours at 6° C."), infringement of the claimed rheological properties may be met if an infringing product exhibits the recited rheological property at any one of the recited storage criteria (e.g., after storing for 24 hours at 6° C.). In other words, in order to determine infringement of the aforementioned hypothetical claim, rheological tests need to be conducted at each of the recited storage criteria (e.g., after storing for 24 hours at 6° C., after storing for 48 hours at 6° C., and after storing for 72 hours at 6° C.).

Due to the high shearing process described herein, the Liquid P formulation may exhibit a unique particle portfolio derived directly from the shearing process. Under microscopic examination using an OMAX M834SLPLAN-050U3 compound microscope in Bright-field mode, samples of the Liquid P stained with Lugol solution may be characterized by fewer and smaller starch particles, as well as the presence of a continuous non-particulate starch matrix. In contrast, a low-sheared conventional potato product comprises numerous visible starch particles in the size range of 100 to 600 μm and no continuous non-particulate starch matrix.

As shown in FIG. 1, at least a portion of the Liquid P 26 can be transferred to a food production plant 28, where the Liquid P 26 can be used to produce various food products. Exemplary food products that the Liquid P can be used to produce include, for example, dips, sauces, dressings, soups, imitation dairy products, spreads, confectionaries, beverages, and any other food product incorporating liquid and/or semi-solid components. In certain embodiments, the food product comprises a dip.

In various embodiments, the food products produced with the Liquid P can comprise at least 1, 5, 10, 15, 20, 25, 30, 35, 40, 45, 50, 55, 60, 65, or 70 weight percent of the Liquid P, based on the total weight of the food product. Additionally or alternatively, in various embodiments, the food products produced with the Liquid P can comprise less than 99, 95, 90, 85, 80, 75, 70, 65, 60, 55, 50, 45, or 40 weight percent of the Liquid P, based on the total weight of the food product.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

The inventive Liquid P production method was tested and compared to a conventional process for producing potato-based food products. Both procedures used the same formulation, which is outlined in TABLE 1, below.

TABLE 1

| Ingredient | Weight Percent |
|---|---|
| Innovator Potatoes (Diced) | 25 |
| Sunflower Oil | 10 |
| Water | 65 |

The starting potato material was diced into 3/8 inch cubes. Furthermore, the potato cubes had been previously blanched, pregelatinized, treated with citric acid, and frozen. The potatoes were then gently thawed in a microwave (1200 W 110 v Panasonic Rotary model NSD997S). Afterwards, the diced and thawed potatoes were then mixed with the oil and water fractions and poured into a Vitamix mixer (Vitamix 5200 model VM0103 11.5 amp 110 v with variable speed). It was at this point that the conventional method and the inventive method described herein began to differ.

For the conventional method, the Vitamix was ran at a low speed setting (3-4 on dial) for 2 to 3 minutes until a consistent, homogeneous puree was achieved. The shear treatment was gentle enough to ensure that there was no appreciable temperature increase. The product was then heated in the microwave with stirring to achieve a temperature of 165 to 170° F. (74 to 77° C.).

For the inventive (i.e., Liquid P) method, the Vitamix was run at a high speed setting (10 on dial) for 5 to 10 minutes until there was a characteristic appearance change where the product became glossy with a distinct sheen and the power draw for the motor noticeably rose. With the amount of mechanical work being applied to the product there was a temperature increase to around 170 to 180° F. (77 to 82° C.) by the end of the shear treatment.

For both methods, the finished product was allowed to stand for 30 minutes at room temperature and a portion was then transferred to the rheometer sample chamber (Brookfield DV3TRVTJ with small sample adaptor kit using a SC4-28 spindle and TC-650 AP controller water bath), where it was placed in the temperature-controlled water bath (set at 12.5° C.). Subsequently, the rheometer spindle was positioned in the product. This represented the "Day 0" product. The remaining product was held in a refrigerator (4 to 8° C.) and samples were removed for measurement in the rheometer after 24, 48, and 72 hours, which referred to the "Day 1," "Day 2," and "Day 3" samples, respectively.

Figure 2:
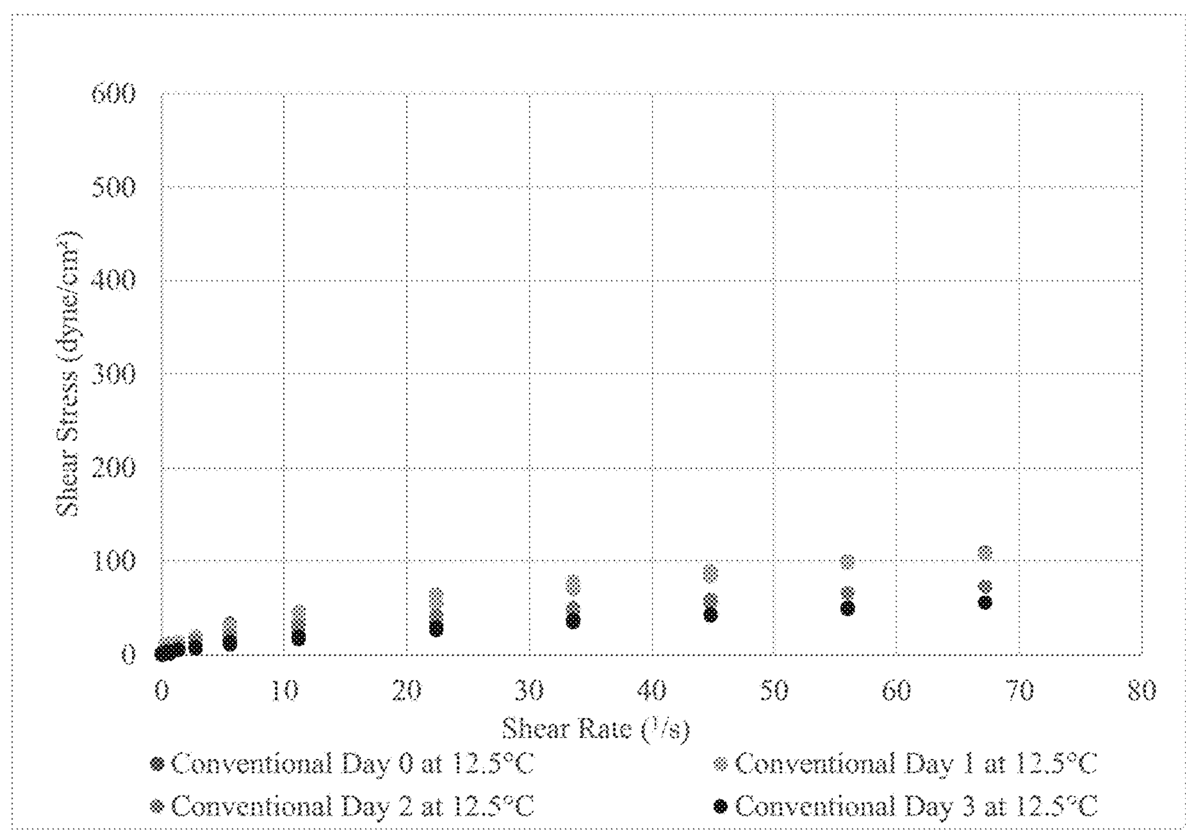
FIG. 2 is a graph depicting the rheological profiles at Days 0-3 of a potato product produced using a conventional shearing process.
Figure 3:
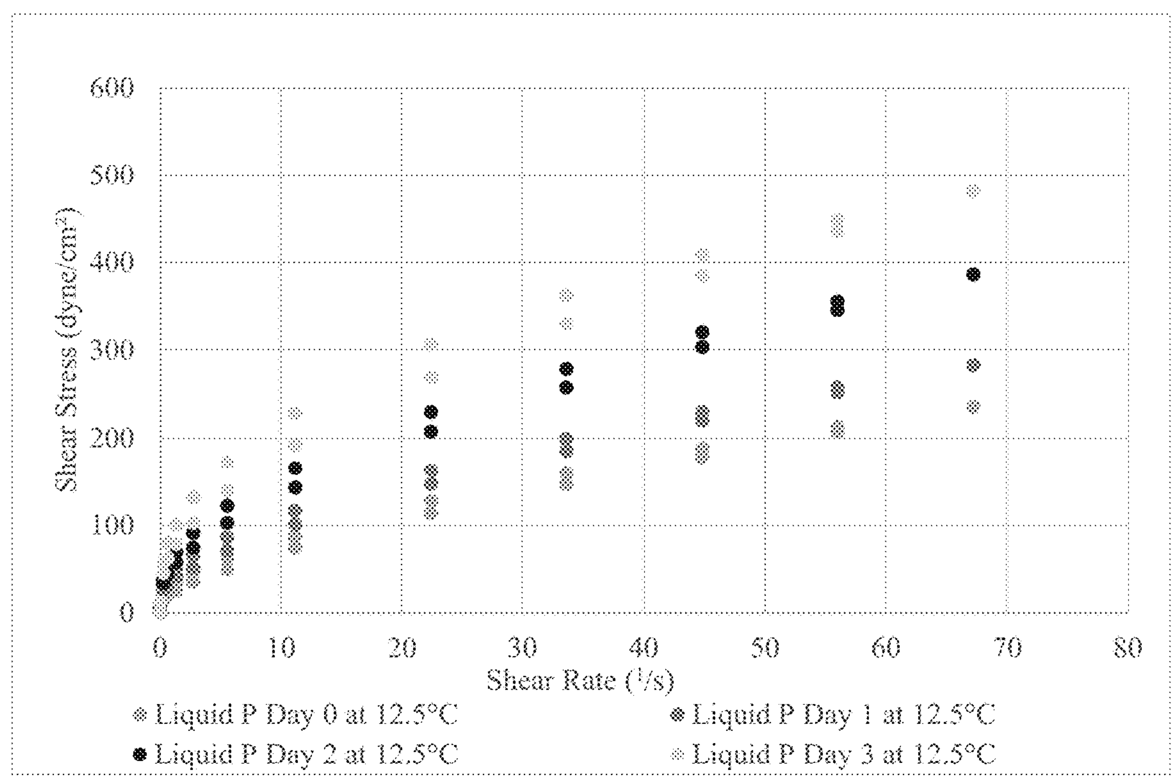
FIG. 3 is a graph depicting the rheological profiles at Days 0-3 of a Liquid P product produced using the inventive shearing process of Example 1.

Once the sample had reached a temperature of 12.5° C., the rheometer ran through a prescribed program. During this program, the spindle was spun at a defined rpm which, together with the wall-to-wall distance between the spindle and the chamber, created a defined shear rate in the sample. Consequently, the corresponding torque can be measured, which directly translated to the experienced shear stress (dynes/cm). The program stepped through a series of rotational speeds at 30 second intervals to create a shear rate range covering 0 to 67.2 l/s. Once the maximum shear rate of 67.2 l/s was reached, the program reduced the rotational speed of the spindle in 30 second intervals back down to zero (as shown in TABLES 2-4 below). Thus, this resulted in two sets of data— one "up" and one "down." The resulting shear stress values were then plotted against shear rate for both sets of data (i.e., the samples from the conventional method and the inventive method). TABLES 2 and 3, below, provide the "up" and one "down" shear stress values at Days 0, 1, 2, and 3 of the samples produced from the conventional process and the inventive Liquid P process described herein. FIGS. 2 and 3 depict the rheological profiles of the conventional samples and the Liquid P, respectively, at Days 0 to 3.

TABLE 2

| Step | Shear Rate (1/s) | Conventional Day 0 at 12.5° C. | Conventional Day 1 at 12.5° C. | Conventional Day 2 at 12.5° C. | Conventional Day 3 at 12.5° C. |
|---|---|---|---|---|---|
| 1 | 0 | 0 | 0 | 0 | 0 |
| 2 | 0 | 2.8 | 4.2 | 1.4 | 1.4 |
| 3 | 0.28 | 7 | 11.2 | 2.8 | 1.4 |
| 4 | 0.7 | 9.8 | 12.6 | 7 | 4.2 |
| 5 | 1.4 | 11.2 | 14 | 8.4 | 5.6 |
| 6 | 2.8 | 18.2 | 19.6 | 15.4 | 8.4 |
| 7 | 5.6 | 33.6 | 32.2 | 21 | 14 |
| 8 | 11.2 | 46.2 | 46.2 | 30.8 | 19.6 |
| 9 | 22.4 | 64.4 | 64.4 | 42 | 29.4 |
| 10 | 33.6 | 78.4 | 78.4 | 50.4 | 37.8 |
| 11 | 44.8 | 89.6 | 89.6 | 58.8 | 43.4 |
| 12 | 56 | 99.4 | 99.4 | 65.8 | 49 |
| 13 | 67.2 | 109.2 | 107.8 | 72.8 | 56 |
| 14 | 0 | 0 | 0 | 0 | 0 |
| 15 | 56 | 98 | 98 | 65.8 | 50.4 |
| 16 | 44.8 | 84 | 84 | 56 | 42 |
| 17 | 33.6 | 70 | 70 | 46.2 | 35 |
| 18 | 22.4 | 54.6 | 54.6 | 35 | 26.6 |
| 19 | 11.2 | 36.4 | 37.8 | 23.8 | 16.8 |
| 20 | 5.6 | 25.2 | 26.6 | 15.4 | 11.2 |
| 21 | 2.8 | 16.8 | 19.6 | 11.2 | 7 |
| 22 | 1.4 | 12.6 | 14 | 8.4 | 5.6 |
| 23 | 0.7 | 8.4 | 12.6 | 5.6 | 1.4 |
| 24 | 0.28 | 8.4 | 8.4 | 5.6 | 2.8 |

TABLE 3

| Step | Shear Rate (1/s) | Liquid P Day 0 at 12.5° C. | Liquid P Day 1 at 12.5° C. | Liquid P Day 2 at 12.5° C. | Liquid P Day 3 at 12.5° C. |
|---|---|---|---|---|---|
| 1 | 0 | 0 | 0 | 0 | 0 |
| 2 | 0 | 4.2 | 8.4 | 5.6 | 11.2 |
| 3 | 0.28 | 19.6 | 30.8 | 37.8 | 57.4 |
| 4 | 0.7 | 26.6 | 40.6 | 51.8 | 79.8 |
| 5 | 1.4 | 35 | 49 | 68.6 | 100.8 |
| 6 | 2.8 | 46.2 | 64.4 | 91 | 131.6 |
| 7 | 5.6 | 61.6 | 85.4 | 121.8 | 172.2 |
| 8 | 11.2 | 86.8 | 116.2 | 165.2 | 228.2 |
| 9 | 22.4 | 127.4 | 162.4 | 229.6 | 306.6 |
| 10 | 33.6 | 159.6 | 198.8 | 278.6 | 362.6 |
| 11 | 44.8 | 187.6 | 229.6 | 320.6 | 408.8 |
| 12 | 56 | 212.8 | 257.6 | 355.6 | 448 |
| 13 | 67.2 | 235.2 | 282.8 | 386.4 | 481.6 |
| 14 | 0 | 0 | 0 | 0 | 0 |
| 15 | 56 | 207.2 | 252 | 345.8 | 435.4 |
| 16 | 44.8 | 177.8 | 219.8 | 303.8 | 385 |
| 17 | 33.6 | 147 | 184.8 | 257.6 | 330.4 |
| 18 | 22.4 | 113.4 | 147 | 207.2 | 268.8 |
| 19 | 11.2 | 74.2 | 100.8 | 142.8 | 191.8 |
| 20 | 5.6 | 49 | 71.4 | 102.2 | 138.6 |
| 21 | 2.8 | 35 | 51.8 | 74.2 | 102.2 |
| 22 | 1.4 | 25.2 | 42 | 57.4 | 78.4 |
| 23 | 0.7 | 21 | 32.2 | 44.8 | 61.6 |
| 24 | 0.28 | 15.4 | 26.6 | 33.6 | 44.8 |

TABLE 4 also provides a direct comparison of the measured shear stress values for the Day 0 and Day 3 samples of the conventional process and the Liquid P process.

TABLE 4

| Step | Shear Rate (1/s) | Conventional Day 0 at 12.5° C. | Conventional Day 3 at 12.5° C. | Liquid P Day 0 at 12.5° C. | Liquid P Day 3 at 12.5° C. |
|---|---|---|---|---|---|
| 1 | 0 | 0 | 0 | 0 | 0 |
| 2 | 0 | 2.8 | 1.4 | 4.2 | 11.2 |
| 3 | 0.28 | 7 | 1.4 | 19.6 | 57.4 |
| 4 | 0.7 | 9.8 | 4.2 | 26.6 | 79.8 |
| 5 | 1.4 | 11.2 | 5.6 | 35 | 100.8 |
| 6 | 2.8 | 18.2 | 8.4 | 46.2 | 131.6 |
| 7 | 5.6 | 33.6 | 14 | 61.6 | 172.2 |
| 8 | 11.2 | 46.2 | 19.6 | 86.8 | 228.2 |

TABLE 4-continued

| Step | Shear Rate (1/s) | Conventional Day 0 at 12.5° C. | Conventional Day 3 at 12.5° C. | Liquid P Day 0 at 12.5° C. | Liquid P Day 3 at 12.5° C. |
|---|---|---|---|---|---|
| 9 | 22.4 | 64.4 | 29.4 | 127.4 | 306.6 |
| 10 | 33.6 | 78.4 | 37.8 | 159.6 | 362.6 |
| 11 | 44.8 | 89.6 | 43.4 | 187.6 | 408.8 |
| 12 | 56 | 99.4 | 49 | 212.8 | 448 |
| 13 | 67.2 | 109.2 | 56 | 235.2 | 481.6 |
| 14 | 0 | 0 | 0 | 0 | 0 |
| 15 | 56 | 98 | 50.4 | 207.2 | 435.4 |
| 16 | 44.8 | 84 | 42 | 177.8 | 385 |
| 17 | 33.6 | 70 | 35 | 147 | 330.4 |
| 18 | 22.4 | 54.6 | 26.6 | 113.4 | 268.8 |
| 19 | 11.2 | 36.4 | 16.8 | 74.2 | 191.8 |
| 20 | 5.6 | 25.2 | 11.2 | 49 | 138.6 |
| 21 | 2.8 | 16.8 | 7 | 35 | 102.2 |
| 22 | 1.4 | 12.6 | 5.6 | 25.2 | 78.4 |
| 23 | 0.7 | 8.4 | 1.4 | 21 | 61.6 |
| 24 | 0.28 | 8.4 | 2.8 | 15.4 | 44.8 |

Figure 4:
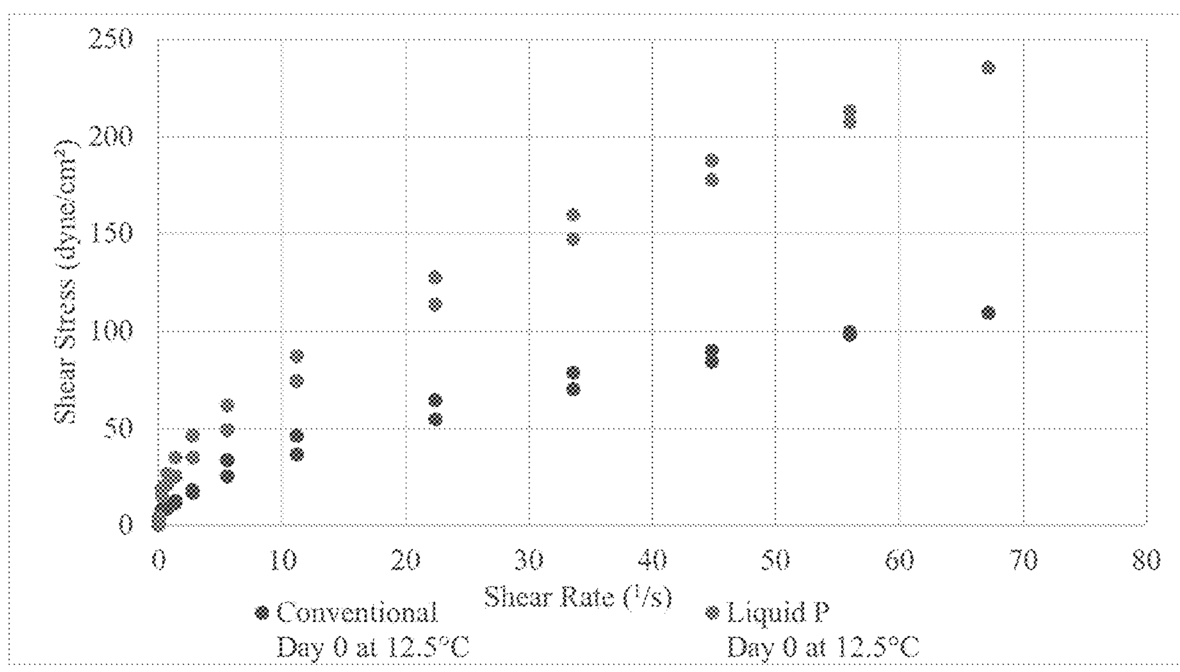
FIG. 4 is a graph depicting the shear stress relative to the shear rate of the Day 0 samples of Example 1 (liquid potato with no other root vegetables)
Figure 5:
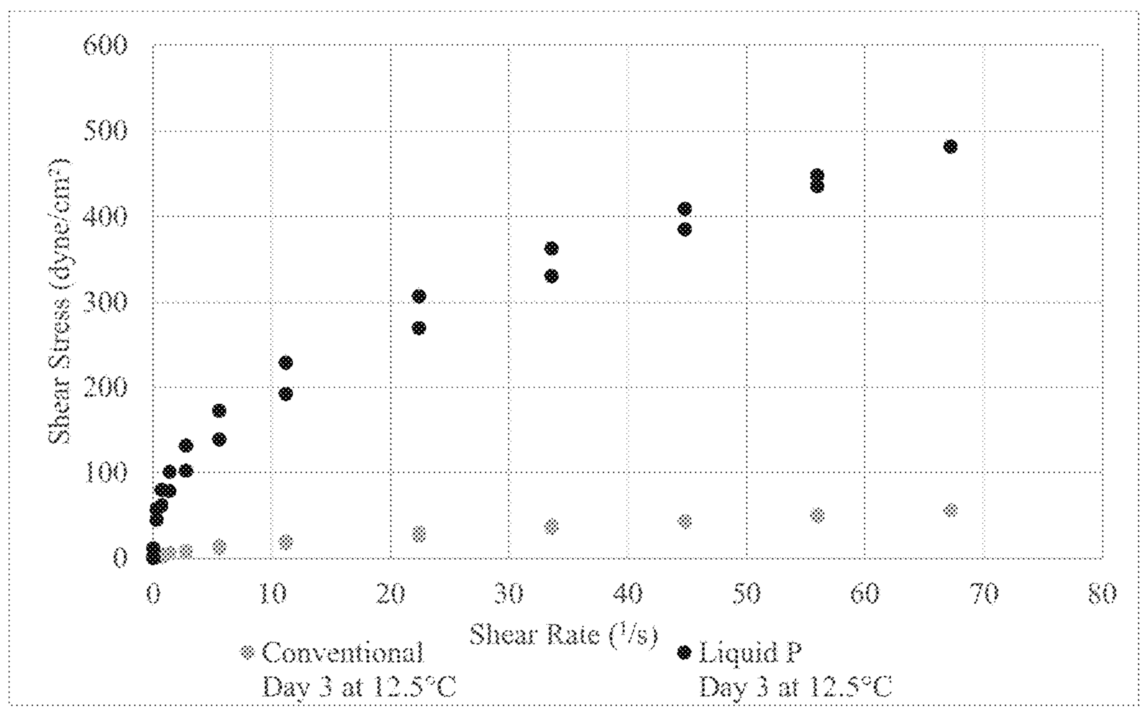
FIG. 5 is a graph depicting the shear stress relative to the shear rate of the Day 3 samples of Example 1.

FIG. 4 depicts a graph that compares the shear stress relative to the shear rate for the Day 0 samples, while FIG. 5 depicts a graph that compares the shear stress relative to the shear rate for the Day 3 samples. As shown in FIG. 4, the Liquid P product produced by the inventive method exhibited a higher viscosity and a slightly non-Newtonian rheology relative to the product produced by the conventional method at Day 0. As shown in FIG. 5, the rheological differences between the Liquid P product and the conventional product became much more apparent at Day 3. More particularly, FIG. 5 shows that the Liquid P product was able to achieve a much higher viscosity (as indicated by the higher shear stress) relative to the conventional product, which actually decreased from Day 0 to Day 3. Furthermore, the Liquid P product demonstrated a clear non-Newtonian rheology at lower shear rates (less than 10 l/s). Thus, the Liquid P product exhibited and was able to achieve a much more desirable rheological profile over time relative to the conventional product. Although not wishing to be bound by theory, it is believed that this rheological profile of the Liquid P product may be at least partially derived from the high shearing conditions used for its production.

Therefore, FIGS. 4 and 5 demonstrate how the Liquid P product exhibits and retains desirable rheological properties at 12.5° C. that closely reflect the desired rheological profiles of certain food products, such as dips.

Example 2

The inventive Liquid P production method was tested and compared to a conventional process for producing potato-based food products. Both procedures used the same formulation, which is outlined in TABLE 5, below. It should be noted that the same procedural methods described in Example 1 were used for the conventional and inventive shearing steps. The only difference for this example was the use and presence of root vegetables, which were added with the potatoes, water, and oil into the Vitamix mixer. Furthermore, the rheological methods from Example 1 were also used to study the resulting samples.

TABLE 5

| Ingredient | Weight Percent |
|---|---|
| Innovator Potatoes (Diced) | 25 |
| Sunflower Oil | 10 |
| Water | 50 |
| Parsnips | 7.5 |
| Celery Root | 7.5 |

Figure 6:
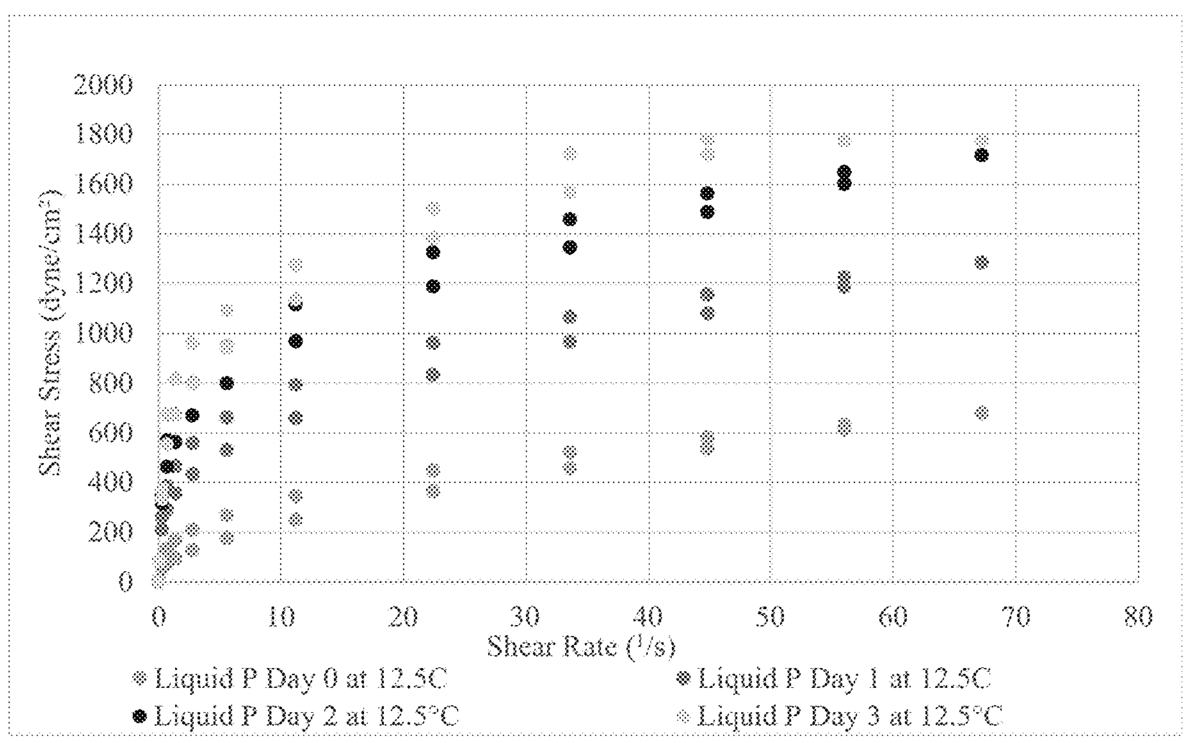
FIG. 6 is a graph depicting the rheological profiles at Days 0-3 of a Liquid P product produced using the inventive shearing process of Example 2.

TABLE 6, below, provides the "up" and one "down" shear stress values at Days 0, 1, 2, and 3 of the samples produced from the inventive Liquid P process described herein. FIG. 6 depicts the rheological profiles of the Liquid P at Days 0 to 3.

TABLE 6

| Step | Shear Rate (1/s) | Liquid P Day 0 at 12.5° C. | Liquid P Day 1 at 12.5° C. | Liquid P Day 2 at 12.5° C. | Liquid P Day 3 at 12.5° C. |
|---|---|---|---|---|---|
| 1 | 0 | 0 | 0 | 0 | 0 |
| 2 | 0 | 9.8 | — | — | 86.8 |
| 3 | 0.28 | 102.2 | 259 | 347.2 | 369.6 |
| 4 | 0.7 | 133 | 385 | 568.4 | 673.4 |
| 5 | 1.4 | 166.6 | 464.8 | 676.2 | 817.6 |
| 6 | 2.8 | 208.6 | 557.2 | 800.8 | 961.8 |
| 7 | 5.6 | 267.4 | 662.2 | 946.4 | 1093 |
| 8 | 11.2 | 343 | 793.8 | 1117 | 1274 |
| 9 | 22.4 | 448 | 961.8 | 1326 | 1502 |
| 10 | 33.6 | 519.4 | 1067 | 1459 | 1723 |
| 11 | 44.8 | 579.6 | 1156 | 1562 | 1777 |
| 12 | 56 | 632.8 | 1226 | 1648 | 1777 |
| 13 | 67.2 | 680.4 | 1285 | 1716 | 1777 |
| 14 | 0 | 0 | 0 | 0 | 0 |
| 15 | 56 | 611.8 | 1187 | 1600 | 1777 |

TABLE 6-continued

| Step | Shear Rate (1/s) | Liquid P Day 0 at 12.5° C. | Liquid P Day 1 at 12.5° C. | Liquid P Day 2 at 12.5° C. | Liquid P Day 3 at 12.5° C. |
|---|---|---|---|---|---|
| 16 | 44.8 | 536.2 | 1081 | 1487 | 1718 |
| 17 | 33.6 | 455 | 967.4 | 1345 | 1565 |
| 18 | 22.4 | 364 | 834.4 | 1189 | 1382 |
| 19 | 11.2 | 250.6 | 660.8 | 968.8 | 1137 |
| 20 | 5.6 | 176.4 | 530.6 | 800.8 | 945 |
| 21 | 2.8 | 127.4 | 432.6 | 670.6 | 799.4 |
| 22 | 1.4 | 95.2 | 355.6 | 561.4 | 674.8 |
| 23 | 0.7 | 72.8 | 289.8 | 462 | 553 |
| 24 | 0.28 | 51.8 | 211.4 | 315 | 333.2 |

TABLE 7, below, provides the measured "up" and one "down" shear stress values for the Day 0 and Day 1 samples of the conventional process and the inventive Liquid P process at 25° C.

TABLE 7

| Step # | Shear Rate (1/s) | Conventional Day 0 at 25° C. | Conventional Day 1 at 25° C. | Liquid P Day 0 at 25° C. | Liquid P Day 1 at 25° C. |
|---|---|---|---|---|---|
| 1 | 0 | 0 | 0 | 0 | 0 |
| 2 | 0 | 8.4 | 19.6 | 5.6 | 16.8 |
| 3 | 0.28 | 28 | 50.4 | 28 | 128.8 |
| 4 | 0.7 | 39.2 | 68.6 | 39.2 | 201.6 |
| 5 | 1.4 | 58.8 | 93.8 | 51.8 | 253.4 |
| 6 | 2.8 | 120.4 | 126 | 72.8 | 312.2 |
| 7 | 5.6 | 175 | 154 | 92.4 | 379.4 |
| 8 | 11.2 | 232.4 | 189 | 119 | 456.4 |
| 9 | 22.4 | 288.4 | 242.2 | 162.4 | 550.2 |
| 10 | 33.6 | 331.8 | 275.8 | 196 | 604.8 |
| 11 | 44.8 | 362.6 | 302.4 | 224 | 645.4 |
| 12 | 56 | 392 | 327.6 | 249.2 | 681.8 |
| 13 | 67.2 | 415.8 | 351.4 | 271.6 | 708.4 |
| 14 | 0 | 0 | 0 | 0 | 0 |
| 15 | 56 | 373.8 | 319.2 | 239.4 | 638.4 |
| 16 | 44.8 | 327.6 | 273 | 205.8 | 568.4 |
| 17 | 33.6 | 275.8 | 226.8 | 169.4 | 498.4 |
| 18 | 22.4 | 218.4 | 173.6 | 130.2 | 417.2 |
| 19 | 11.2 | 152.6 | 116.2 | 85.4 | 313.6 |
| 20 | 5.6 | 107.8 | 85.4 | 57.4 | 240.8 |
| 21 | 2.8 | 75.6 | 61.6 | 40.6 | 189 |
| 22 | 1.4 | 47.6 | 40.6 | 28 | 148.4 |
| 23 | 0.7 | 32.2 | 28 | 22.4 | 120.4 |
| 24 | 0.28 | 21 | 18.2 | 15.4 | 86.8 |

Figure 7:
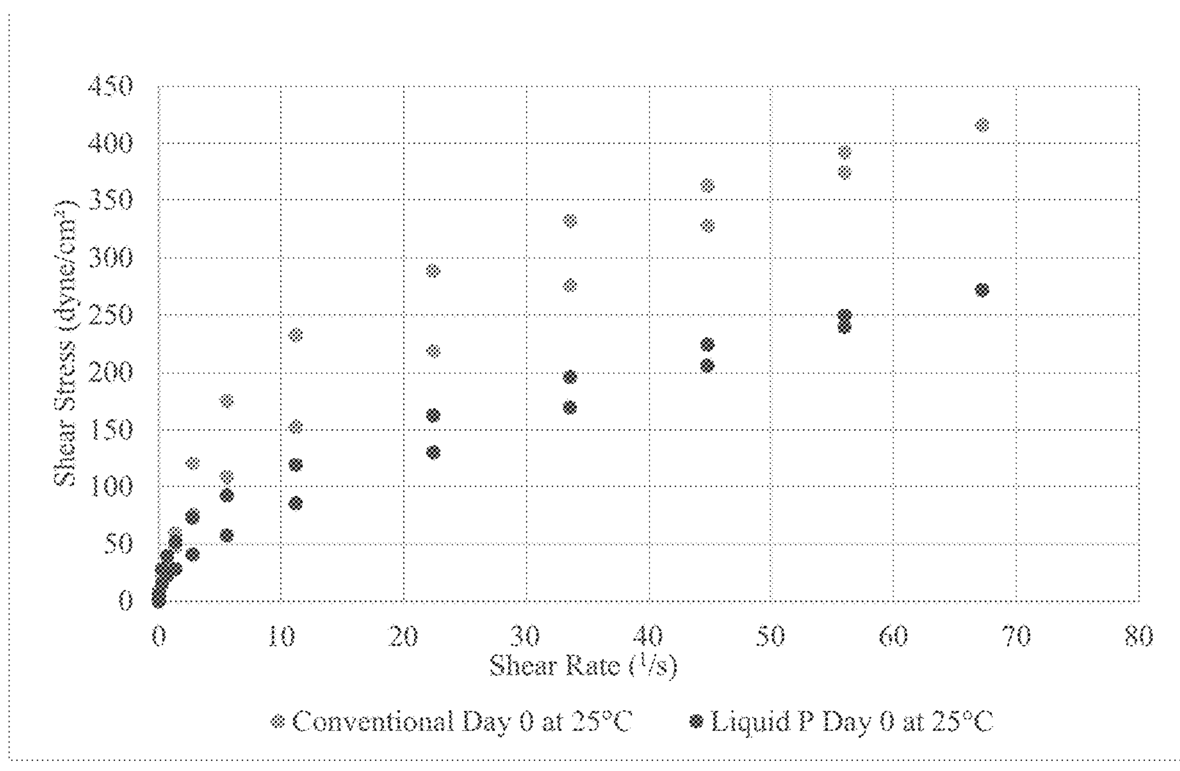
FIG. 7 is a graph depicting the shear stress relative to the shear rate of the Day 0 samples of Example 2 (liquid potato with 15 weight % other root vegetables)
Figure 8:
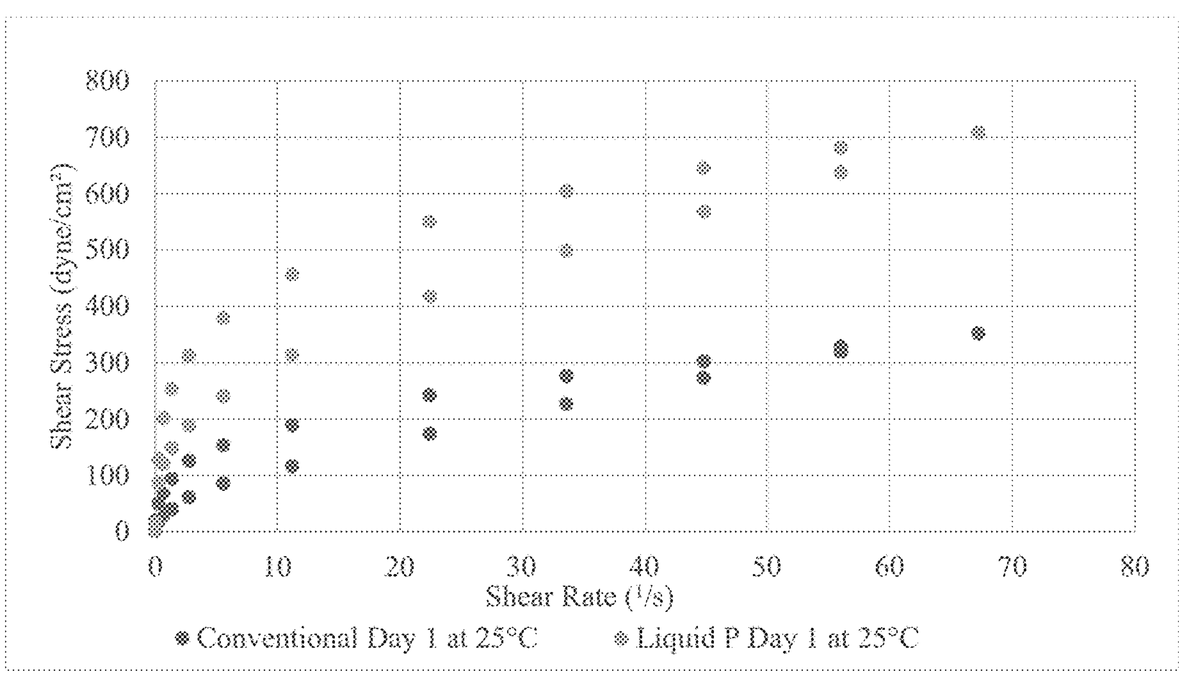
FIG. 8 is a graph depicting the shear stress relative to the shear rate of the Day 1 samples of Example 2.

FIG. 7 depicts a graph that compares the shear stress relative to the shear rate for the Day 0 samples, while FIG. 8 depicts a graph that compares the shear stress relative to the shear rate for the Day 1 samples. As shown in FIG. 7, the Liquid P product produced by the inventive method actually exhibited a lower viscosity relative to the product produced by the conventional method at Day 0. However, as shown in FIG. 8, the rheological differences between the Liquid P product and the conventional product became much more apparent and significantly distinctive over time, as shown by the data at Day 1. More particularly, FIG. 8 shows that the Liquid P product was able to achieve a much higher viscosity (as indicated by the higher shear stress) relative to the conventional product after a single day. Thus, while the rheological profile of the conventional product began to degrade after a few days, the Liquid P was able to maintain and achieve a desirable rheological profile that corresponds to a desired texture for food products, such as dips.

Furthermore, the Liquid P product demonstrated a clear non-Newtonian rheology at lower shear rates (less than 10 l/s). Thus, the Liquid P product exhibited and was able to achieve a much more desirable rheological profile over time relative to the conventional product. Although not wishing to be bound by theory, it is believed that this rheological profile of the Liquid P product may be at least partially derived from the high shearing conditions used for its production.

Therefore, FIG. 8 demonstrates how the Liquid P product exhibits and retains desirable rheological properties at 25° C. that closely reflect the desired rheological profiles of certain food products, such as dips.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone;

A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

As used herein, the term "potato component" refers to the component in the potato feed that is derived solely from potatoes.

NUMERICAL RANGES

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method of making a food product, the method comprising:

(a) providing an initial potato feed comprising one or more potatoes;

(b) at least partially gelatinizing said initial potato feed to thereby form a gelatinized potato feed, wherein said at least partially gelatinizing comprises—

(i) contacting at least a portion of said initial potato feed with water over a time period of 1 to 30 minutes at a temperature of at least 80° C., or (ii) contacting at least a portion of said initial potato feed with steam over a time period of at least 5 minutes and at a temperature of less than 185° C.;

(c) shearing at least a portion of said gelatinized potato feed in the presence of an added oil for at least 1 minute with a shearing device to thereby form a liquid potato product, wherein said shearing provides an amount of mechanical work to said gelatinized potato feed so as to increase the temperature of said gelatinized potato feed to at least 67° C., wherein said added oil is present during said shearing in sufficient quantities so that said liquid potato product comprises at least 4 weight percent of said added oil; and (d) forming said food product from at least a portion of said liquid potato product, wherein said food product comprises a dip, a sauce, a dressing, a soup, an imitation dairy product, a beverage, a confectionary, or a spread.

2. The method according to claim 1, wherein said liquid potato product has a dynamic viscosity in the range of 70 cP to 250,000 cP at a shear rate of 4 l/s and a temperature between 12.5° C. to 95° C.

3. The method according to claim 1, wherein said initial potato feed has an initial moisture content and said gelatinized potato feed has a second moisture content, wherein said second moisture content is less than 10 percent lower than said initial moisture content.

4. The method according to claim 1, wherein said one or more potatoes comprise raw potatoes.

5. The method according to claim 1, wherein said liquid potato product is a non-Newtonian fluid exhibiting a non-linear relationship between shear stress and shear rate, wherein said liquid potato product exhibits a first shear stress value at a shear rate of 22.4 l/s after storage at 24 hours at 6° C. and a second shear stress value at a shear rate of 22.4 l/s after storage at 72 hours at 6° C., wherein said second shear stress value is greater than said first shear stress value.

6. The method according to claim 1, wherein said gelatinized potato feed is subjected to said shearing at a temperature of at least 35° C. and less than 125° C. over a time period of 2 to 60 minutes with said shearing device.

7. The method according to claim 1, wherein said liquid potato product comprises 5 to 90 weight percent of said one or more potatoes.

8. The method according to claim 1, wherein said food product comprises at least 70 weight percent of said liquid potato product.

9. The method according to claim 1, wherein said gelatinized potato feed is subjected to said shearing for at least 4 minutes with said shearing device and until said gelatinized potato feed has reached a temperature of at least 77° C.

10. The method according to claim 1, wherein said gelatinized potato feed is subjected to said shearing for 5 to 10 minutes with said shearing device and until said gelatinized potato feed has reached a temperature of at least 77° C.

11. The method according to claim 1, further comprising, prior to step (d), cooling at least a portion of said liquid potato product to a second temperature below the temperature obtained during the shearing of step (c).

12. A method of making an imitation dairy product, the method comprising:

(a) providing an initial potato feed comprising one or more potatoes;

(b) at least partially gelatinizing said initial potato feed to thereby form a gelatinized potato feed, wherein said at least partially gelatinizing comprises—

(i) contacting at least a portion of said initial potato feed with water over a time period of 5 to 30 minutes at a temperature of at least 80° C., or (ii) contacting at least a portion of said initial potato feed with steam over a time period of 5 to 30 minutes and at a temperature of less than 185° C.;

(c) shearing at least a portion of said gelatinized potato feed in the presence of an added oil for at least 2 minutes with a shearing device to thereby form a liquid potato product, wherein said shearing provides an amount of mechanical work to said gelatinized potato feed so as to increase the temperature of said gelatinized potato feed to at least 67° C., wherein said added oil is present during said shearing in sufficient quantities so that said liquid potato product comprises at least 4 weight percent of said added oil; and (d) forming said imitation dairy product from at least a portion of said liquid potato product.

13. The method according to claim 12, wherein said liquid potato product has a dynamic viscosity in the range of 70 cP to 250,000 cP at a shear rate of 4 l/s and a temperature between 12.5° C. to 95° C.

14. The method according to claim 12, wherein said initial potato feed has an initial moisture content and said gelatinized potato feed has a second moisture content, wherein said second moisture content is less than 10 percent lower than said initial moisture content.

15. The method according to claim 12, wherein said one or more potatoes comprise raw potatoes.

16. The method according to claim 12, wherein said liquid potato product is a non-Newtonian fluid exhibiting a non-linear relationship between shear stress and shear rate, wherein said liquid potato product exhibits a first shear stress value at a shear rate of 22.4 l/s after storage at 24 hours at 6° C. and a second shear stress value at a shear rate of 22.4 l/s after storage at 72 hours at 6° C., wherein said second shear stress value is greater than said first shear stress value.

17. The method according to claim 12, wherein said gelatinized potato feed is subjected to said shearing at a temperature of at least 35° C. and less than 125° C. over a time period of 3 to 60 minutes with said shearing device.

18. The method according to claim 12, wherein said liquid potato product comprises 5 to 90 weight percent of said one or more potatoes.

19. The method according to claim 12, wherein said imitation dairy product comprises at least 70 weight percent of said liquid potato product.

20. The method according to claim 12, wherein said gelatinized potato feed is subjected to said shearing for at least 4 minutes with said shearing device and until said gelatinized potato feed has reached a temperature of at least 77° C.

21. The method according to claim 12, wherein said gelatinized potato feed is subjected to said shearing for 5 to 10 minutes with said shearing device and until said gelatinized potato feed has reached a temperature of at least 77° C.

22. The method according to claim 12, further comprising, prior to step (d), cooling at least a portion of said liquid potato product to a second temperature below the temperature obtained during the shearing of step (c).

23. The method according to claim 1, wherein said added oil is present during said shearing in sufficient quantities so that said liquid potato product comprises at least 8 weight percent of said added oil.

24. The method according to claim 12, wherein said added oil is present during said shearing in sufficient quantities so that said liquid potato product comprises at least 8 weight percent of said added oil.

* * * * *